(12) United States Patent
Schulz et al.

(10) Patent No.: US 7,935,323 B2
(45) Date of Patent: May 3, 2011

(54) SYSTEM AND METHOD FOR HYDROGEN SULFIDE DECONTAMINATION

(75) Inventors: Marc Schulz, Calgary (CA); Leonard McKeary, Chestermere (CA)

(73) Assignee: Cody Liners Ltd., Alberta (CA)

( * ) Notice: Subject to any disclaimer, the term of this patent is extended or adjusted under 35 U.S.C. 154(b) by 82 days.

(21) Appl. No.: 12/253,824

(22) Filed: Oct. 17, 2008

(65) Prior Publication Data
US 2009/0100753 A1    Apr. 23, 2009

Related U.S. Application Data

(60) Provisional application No. 60/981,333, filed on Oct. 19, 2007.

(51) Int. Cl.
*B01D 53/14* (2006.01)

(52) U.S. Cl. ......... 423/220; 95/8; 95/13; 95/24; 95/181; 95/199; 95/235; 96/234; 96/244; 96/245; 422/170

(58) Field of Classification Search ............... 95/49, 235, 95/8, 13, 24, 199, 159, 169, 178, 181; 96/234, 96/244, 245; 423/242.1, 220, 228, 229; 422/168, 422/170
See application file for complete search history.

(56) References Cited

U.S. PATENT DOCUMENTS

| | | | | |
|---|---|---|---|---|
| 3,170,766 | A | * | 2/1965 | Townsend ............. 422/189 |
| 5,405,591 | A | * | 4/1995 | Galloway ............. 423/228 |
| 5,716,587 | A | * | 2/1998 | Khanmamedov ............. 422/168 |

* cited by examiner

*Primary Examiner* — Duane Smith
*Assistant Examiner* — Tiffany N Palmer
(74) *Attorney, Agent, or Firm* — McGlew and Tuttle, P.C.

(57) ABSTRACT

The invention describes a system and method for hydrogen sulfide decontamination of natural gas using a scavenging reagent. The system uses a scavenging reagent within two reactors wherein the consumption of scavenging reagent is optimized by the control of flow of clean and partially-consumed scavenging reagent within and between the two reactors.

11 Claims, 3 Drawing Sheets

SYSTEM AND METHOD FOR HYDROGEN SULFIDE DECONTAMINATION

CROSS REFERENCE TO RELATED APPLICATIONS

This application claims the benefit of priority under 35 U.S.C. §120 of U.S. Provisional Patent Application No. 60/981,333 filed Oct. 19, 2007, the entire contents of which are incorporated herein by reference.

FIELD OF THE INVENTION

The invention describes a system and method for hydrogen sulfide decontamination of natural gas using a scavenging reagent. The system uses a scavenging reagent within two reactors wherein the consumption of scavenging reagent is optimized by the control of flow of clean and partially-consumed scavenging reagent within and between the two reactors.

BACKGROUND OF THE INVENTION

As is known, hydrogen sulfide ($H_2S$) is a highly poisonous and corrosive contaminant of natural gas and crude petroleum. While only relatively small amounts of $H_2S$ occur in crude petroleum, natural gas can contain up to 40% by volume. As a result, $H_2S$ must be removed to acceptable levels prior to delivery to the refinery or main gas distribution system. Generally, in order to meet governmental, technical and natural gas sales specifications, $H_2S$ concentrations must be at very low levels (usually less than 16 ppm).

Hydrogen sulfide is a covalent hydride structurally related to water ($H_2O$) as oxygen and sulfur occur in the same periodic table group. However, hydrogen sulfide is weakly acidic, dissociating in aqueous solution into hydrogen cations $H^+$ and the hydrosulfide anion $HS^-$:

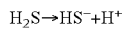

$$H_2S \rightarrow HS^- + H^+$$

Hydrogen sulfide reacts with many metals cations to produce the corresponding metal sulfides.

In petroleum refineries, the normal hydrodesulfurization processes liberate sulfur from petroleum by the action of hydrogen. The resulting $H_2S$ is converted to elemental sulfur by partial combustion via the Claus process, which is a major source of elemental sulfur.

The most highly utilized processes for sweetening sour natural gas is to use amine solutions to remove the hydrogen sulfide. These processes are known simply as the 'amine processes', or alternatively as the Girdler process, and are used in 95 percent of North American gas sweetening operations. Generally, the sour gas is run through a tower, which contains the amine solution. This solution has an affinity for sulfur, and absorbs it much like glycol absorbing water. There are several amine solutions that are commonly used, including monoethanolamine (MEA), methyldiethanolamine (MDEA), and diethanolamine (DEA) each of which in their liquid form, will absorb sulfur compounds from natural gas as it passes through the column. The effluent gas or sweet gas is virtually free of $H_2S$ compounds. Like the process for NGL extraction and glycol dehydration, the amine solution used can be regenerated (that is, the absorbed sulfur is removed), allowing it to be reused to treat more sour gas. This technology is capital intensive and is generally more suitable for larger scale operations.

In other systems, the use of liquid scavengers within columns is also known. In these systems, sour gas and a liquid scavenger agent are introduced into a column. The scavenger reacts with sour gas within the column such that both sweet gas and "spent" scavenger are removed from the top of the column. The most common liquid scavenger is an amine-aldehyde condensate manufactured by an exothermic reaction of monoethanolamine and formaldehyde. Water and methanol are usually required to keep the formaldehyde in solution and prevent polymerization. The resulting "scavenger" product is a hexahydrotriazine, and is commonly called "triazine" in the industry. The "triazine" is typically offered in a water-based solution. In most applications, the reaction products are also water soluble, with very low toxicity characteristics making this a relatively simple system to handle. Other scavenging reagents are known to those skilled in the art.

Importantly, the scavenging reactions between triazine and $H_2S$ can be "overspent" such that the reaction products are solids. Generally, it is preferred that solid reaction products are not produced for ease of subsequent handling. Thus, most reactions are controlled to underutilize the scavenging reagent.

While the liquid scavenger system is a relatively cost effective system as a result of the relatively low capital cost of equipment, simple logistics, and simple waste treatment, the cost of scavenger reagent is relatively high. Typically, as a result of the cost of the liquid scavenger, the overall process cost of $H_2S$ removal will range from a low of $8/pound to $20/pound of $H_2S$ removed. Notwithstanding the cost of reagent, the liquid scavenger system is a preferred system for offshore gas treatment and onshore sites where there is a relatively small amount of $H_2S$ that needs to be treated.

However, there continues to be a need for a technology that improves the efficiency of utilization of scavenger reagent, such that the overall process economics can be improved.

SUMMARY OF THE INVENTION

In accordance with the invention, there is provided a system and method for improving the efficiency of utilization of scavenger chemical reagent in a sour gas treatment process.

In a first embodiment, the invention provides a system for removing hydrogen sulfide from natural gas comprising: a first reactor for reacting a partially-consumed scavenging reagent with sour natural gas and for producing partially-sweetened natural gas; a separator operatively connected to the first reactor for separating consumed scavenging reagent from the partially-sweetened natural gas; a second reactor operatively connected to the separator for reacting clean scavenging reagent with the partially-sweetened natural gas and for producing sweetened natural gas; a scavenging reagent delivery system operatively connected to the first reactor and second reactor, the scavenging reagent delivery system for delivering clean scavenging reagent to the second reactor and partially-consumed scavenging reagent to the first reactor; and, a control system for controlling the relative flow of scavenging reagent to the first and second reactors in response to the hydrogen sulfide concentration within the partially-sweetened natural gas.

In a further embodiment, the invention provides a method for removing hydrogen sulfide from natural gas comprising the following steps in any order: a) reacting a partially-consumed scavenging reagent with sour natural gas to produce a partially-sweetened natural gas and consumed scavenging reagent; b) separating consumed scavenging reagent from the partially-sweetened natural gas; and, c) reacting clean scavenging reagent with the partially-sweetened natural gas to produce sweetened natural gas; wherein the clean scavenging reagent from step c) is used as partially-consumed scavenging reagent in step a).

BRIEF DESCRIPTION OF THE DRAWINGS

The invention is described by the following detailed description and drawings wherein.

DETAILED DESCRIPTION

In accordance with the invention and with reference to the figures, embodiments of a system and method for removing hydrogen sulfide from natural gas are described.

The system and method improves the efficiency of scavenger reagent (SR) utilization in typical hydrogen sulfide sweetening processes.

Figure 1:
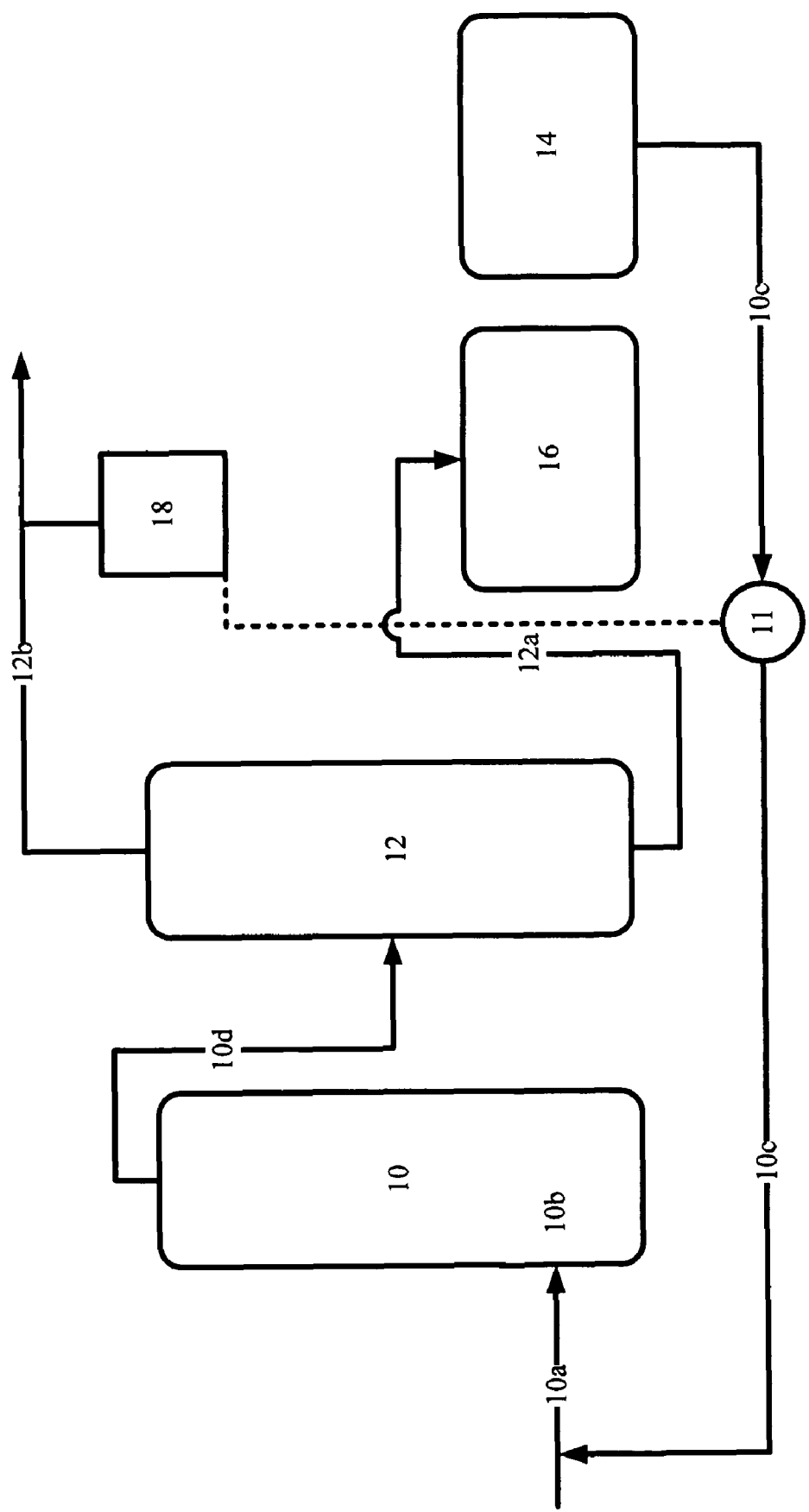
FIG. 1 is a schematic diagram of a hydrogen sulfide plant and polishing system in accordance with the prior art.

As shown in FIG. 1 and in accordance with the prior art, a typical hydrogen sulfide treatment plant utilizing a scavenger reagent includes a primary reactor (or column) 10 and separator 12. Sour gas 10a is introduced at a low point 10b in the column together with SR 10c from a fresh SR source 14 by pump 11. The sour gas and SR pass upwardly through the column whereby the sour gas is sweetened and the SR is consumed as known to those skilled in the art. The sweetened gas and SR 10d collectively pass over the top of the column and thereafter enter separator 12 whereby the sweetened gas and liquid SR are separated on the basis of density. The liquid SR is removed from the bottom 12a of the separator and delivered to a spent reagent tank 16 for disposal and the sweetened gas is removed from the top 12b of the separator for delivery. The system is controlled by an appropriate control and feed back system 18 to monitor the $H_2S$ concentration in the sweetened gas 12b and to control the flow of SR to the column 10 through pump 11.

In order for the sweetening reactions to proceed and to ensure that the sweetened gas meets the appropriate regulatory standard for $H_2S$ removal, the SR must be added in significant excess to ensure that the $H_2S$ removal reaction proceeds to completion. As a result, due to normal fluctuations in the $H_2S$ concentration entering the column 10, and to provide an appropriate safety margin, significant amounts of SR delivered to the spent reagent tank 16 may be unreacted.

Figure 2:
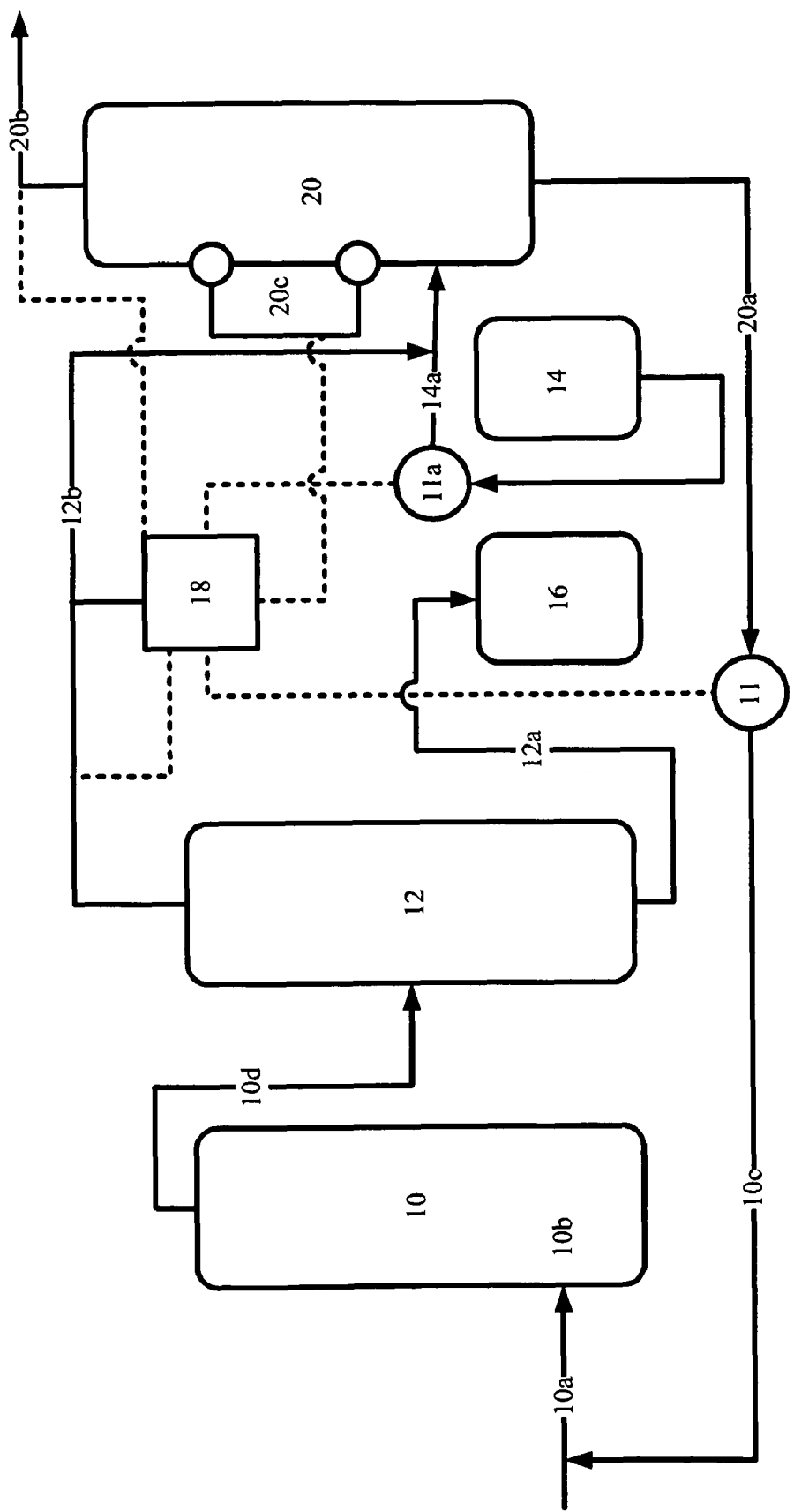
FIG. 2 is a schematic diagram of a hydrogen sulfide processing plant and polishing system in accordance with the invention.

In accordance with the invention, and with reference to FIG. 2, a system to improve the efficiency of SR utilization is provided. Generally, the primary desulfurization system 10, 12 is used with partially-consumed SR 20a to produce a "semi-sweet" gas 12b and clean SR 14a is used to polish the semi-sweet gas 12b to produce a sweet gas 20b. As a result, the system, by virtue of the use of clean SR in the final polishing step enables more effective control of the utilization of SR.

In accordance with the invention, the system as described in FIG. 1 is modified to include a polishing system 20 comprising a second column that functions similarly to column 10 with the exception that it is operated as a combined reactor and separator. In addition, the system introduces clean SR 14a directly to column 20 prior to introduction into column 10 and the system is controlled such that semi-sweet gas 12b is introduced into column 20. In addition, the system includes pump 11a to deliver clean SR to column 20 and the control system 18 is modified to balance the effective flow rates through both pumps 11, 11a in response to the measured $H_2S$ concentration from separator 12, reagent levels in column 20 as measured by level controller 20c and in the produced sweetened gas.

Generally, the control system operates to ensure that the $H_2S$ concentration exiting column 20 is low (generally less than 16 ppm, ideally 0 ppm). Primary control of the system is by conducted on the basis of the measured $H_2S$ level between separator 12 and column 20. For example, for a given set of operating parameters (i.e. based on the $H_2S$ levels, system volumes and stoichiometry of the specific system), the system may be designed such that the measured $H_2S$ level in semi-sweet gas 12b is in the range of 10-100 ppm in order that a desired $H_2S$ level of the sweet gas is at the desired level (ideally 0 ppm). As such, if the control system determines that the $H_2S$ level is within this range, pumps 11 and 11a will in turn be run at a given flow rate. If the $H_2S$ level is detected to be above this range, indicating a possible spike in $H_2S$ level in the source gas, the control system will increase flow rates through pumps 11, 11a so as to increase the flow of SR within the columns. Similarly, a decrease in $H_2S$ level below this range, will cause a decrease in flow rates through pumps 11, 11a so as to reduce the flow of SR in the columns. Readings of $H_2S$ concentrations in the sweet gas 20b and source gas 10a may be made for safety purposes and reference points but are generally not required for system control after the system is operating.

By way of representative example, the control system and the balance of SR is described as follows: If the semi-sweet gas 12b is 95% desulfurized in column 10, the remaining 5% of the $H_2S$ is removed by reacting the semi-sweet gas with clean SR in column 20. The clean SR ensures that the desulfurization reactions in column 20 proceed to effectively 100% completion whilst depleting only 5% of the desulfurization capacity of the specific volume of clean SR. The partially-consumed SR 20a is introduced into column 10 at a flow rate that ensures the complete utilization of SR to produce semi-sweet gas 12b. By responding to changes in the $H_2S$ concentration in semi-sweet gas 12b, the controller 18 can adjust the relative flow rates of SR between columns 10 and 20 and the level of SR within column 20. As a result, the system can be controlled to more effectively ensure complete utilization of SR whilst producing sweet gas. Thus, depleted SR entering tank 16 is fully depleted.

Figure 2A:
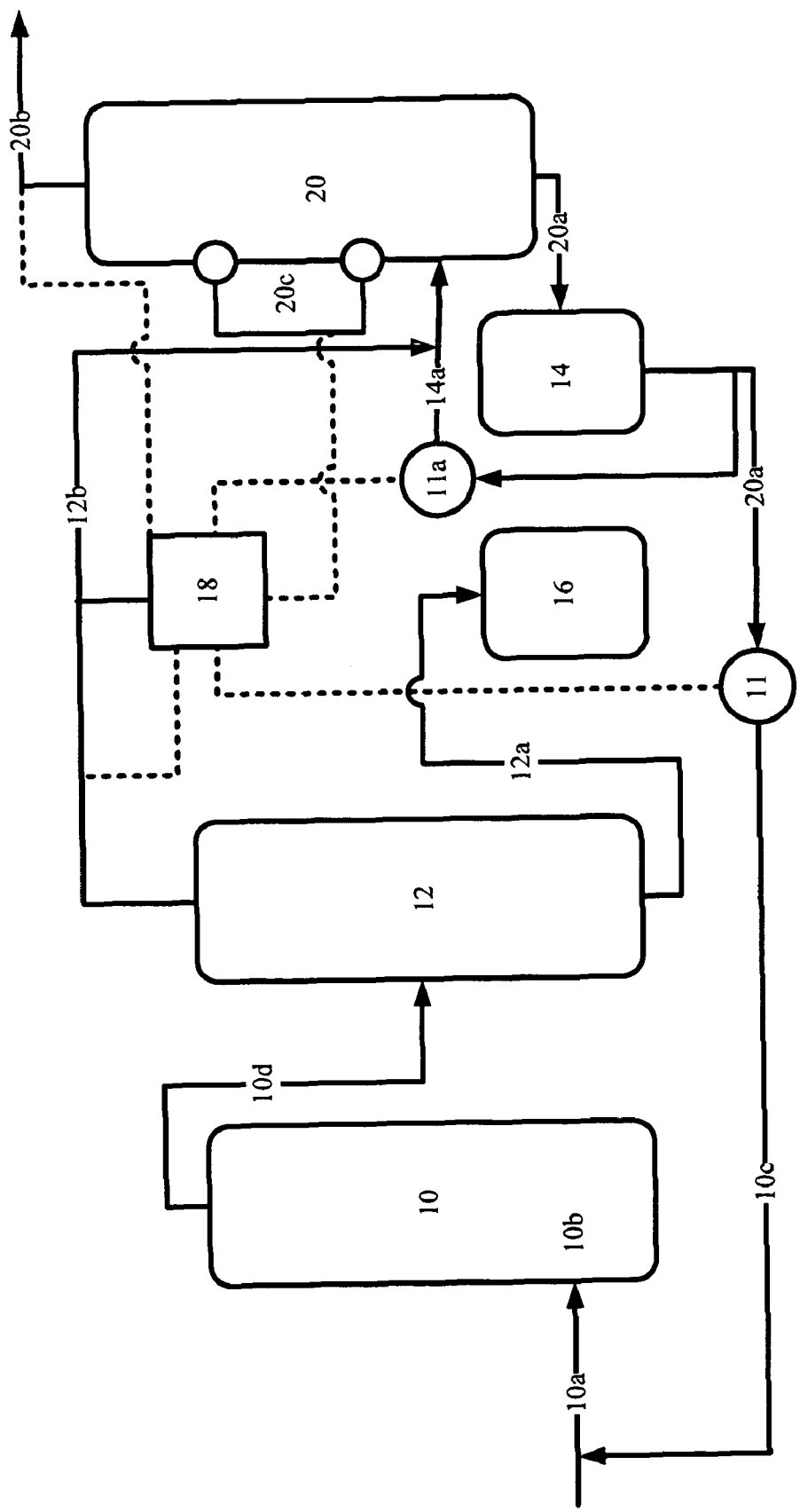
FIG. 2A is a schematic diagram of a hydrogen sulfide processing plant and polishing system in accordance with an alternate embodiment of the invention.

In a further embodiment as shown in FIG. 2A, partially consumed SR 20a is returned to tank 14a prior to pumping to column 10. From a practical perspective, this configuration may be preferred in the field particularly if the system is being retro-fit to a system in accordance with the prior art.

As a result, the system is able to effectively utilize SR without the shortcomings of the prior art by specifically being able to fully utilize the SR.

EXAMPLE

A cost comparison between the prior art and the subject process is detailed in Table 1 for a triazine SR under the stated operating conditions. It is understood that specific operating conditions will vary depending on the numerous variables including vessel sizes, operating pressures and temperature and gas source as may be established for or measured at a particular site.

TABLE 1

Cost Comparison at Representative Operating Conditions

Operating Conditions

| | |
|---|---|
| Design Pressure | 1440 psia |
| Operating Pressure | 300 psia |
| Operating Temp | 90° F. |
| Gas Flow | 1.0 MMscfd |
| $H_2S$ Inlet | 2400 ppm |
| $H_2S$ Outlet | 0 ppm |
| Scavenging Reagent | Triazine |
| Scavenging Rate (100%) | 0.2 L/ppm/MMscfd |

Cost Comparison

| Parameter | Subject Process | Prior Art Process |
|---|---|---|
| System Efficiency | 100% | 80% |
| Scavenging Rate | 0.2 l/ppm/MMscf | 0.25 l/ppm/MMscf |
| Daily Chemical Use | 480 l/day | 600 l/day |
| Cost/Liter | 3 $/liter | 3 $/liter |
| Daily Chemical Cost | 1440 $/day | 1800 $/day |
| Process Cost | 1.44 $/Mcf | 1.8 $/Mcf |
| Changeout/fill frequency | 67 Days | 53 Days |
| Changeout per year | 5.5 Fills/year | 7 Fills/year |
| Annual Chemical Cost | $525,000/year | $657,000 $/year |
| Annual Savings | $131,400/year | |

As shown, it is clear that based on the efficiency of fully using the SR, significant costs savings can be realized with the subject technology for a typical sour gas well.

Although the present invention has been described and illustrated with respect to preferred embodiments and preferred uses thereof, it is not to be so limited since modifications and changes can be made therein which are within the full, intended scope of the invention.

The invention claimed is:

1. A system for removing hydrogen sulfide from natural gas comprising:
    a first reactor receiving a partially-consumed scavenging reagent and a sour natural gas, said partially-consumed scavenging reagent reacting with said sour natural gas in said first reactor to produce a partially-sweetened natural gas and a consumed scavenging reagent;
    a separator operatively connected to said first reactor, said separator receiving said consumed scavenging reagent and said partially-sweetened natural gas, said consumed scavenging reagent being separated from said partially-sweetened natural gas via said separator;
    a second reactor operatively connected to the separator, said second reactor receiving a clean scavenging reagent and said partially-sweetened natural gas, said clean scavenging reagent reacting with said partially-sweetened natural gas in said second reactor to produce a sweetened natural gas;
    a scavenging reagent delivery system operatively connected to the first reactor and said second reactor, said scavenging reagent delivery system delivering said clean scavenging reagent to said second reactor and delivering said partially-consumed scavenging reagent to said first reactor; and
    a control system controlling a flow of said partially-consumed scavenging reagent to said first reactor and a flow of said clean scavenging reagent to said second reactor based on a hydrogen sulfide concentration within said partially-sweetened natural gas.

2. A system as in claim 1, wherein the control system includes an $H_2S$ sensor operatively connected between said separator and said second reactor for measuring $H_2S$ concentration exiting said separator and wherein the control system is responsive to the $H_2S$ concentration exiting said separator to increase or decrease the relative flow of said partially-consumed scavenging reagent to said first reactor and to increase or decrease the flow of said clean scavenger reagent to said second reactor.

3. A system as in claim 1, wherein the second reactor includes a level controller operatively connected to the control system, said level controller controlling a level of scavenging reagent within said second reactor.

4. A system for removing hydrogen sulfide from natural gas comprising:
    a first reactor receiving a partially-consumed scavenging reagent and a sour natural gas, said partially-consumed scavenging reagent reacting with said sour natural gas in said first reactor to produce a partially-sweetened natural gas and a consumed scavenging reagent, said first reactor separating said consumed scavenging reagent from said partially-sweetened natural gas;
    a second reactor operatively connected to said first reactor, said second reactor receiving a clean scavenging reagent and said partially-sweetened natural gas, said clean scavenging reagent reacting with said partially-sweetened natural gas in said second reactor to produce a sweetened natural gas;
    a scavenging reagent delivery system operatively connected to said first reactor and said second reactor, said scavenging reagent delivery system delivering clean scavenging reagent to said second reactor and delivering said partially-consumed scavenging reagent to said first reactor; and
    a control system controlling a flow of said partially-consumed scavenging reagent to said first reactor and a flow of said clean scavenging reagent to said second reactor based on a hydrogen sulfide concentration within said partially-sweetened natural gas, wherein said control system includes an $H_2S$ sensor operatively connected between said first reactor and said second reactor, said $H_2S$ sensor measuring a $H_2S$ concentration of said partially-sweetened natural gas exiting said first reactor and wherein said control system is responsive to the $H_2S$ concentration of said partially-sweetened natural gas exiting said first reactor to increase or decrease said flow of partially-consumed scavenging reagent to said first reactor and to increase or decrease said flow of said clean scavenging reagent to said second reactor.

5. A system as in claim 4, wherein said second reactor includes a level controller operatively connected to said control system, said level controller controlling a level of scavenging reagent within said second reactor.

6. A method for removing hydrogen sulfide from natural gas comprising the following steps in any order:
    providing a partially-consumed scavenging reagent;
    providing a sour natural gas;
    providing a clean scavenging reagent;
    reacting said partially-consumed scavenging reagent with said sour natural gas to produce a partially-sweetened natural gas and a consumed scavenging reagent;
    separating said consumed scavenging reagent from said partially-sweetened natural gas; and
    reacting said clean scavenging reagent with said partially-sweetened natural gas to produce a sweetened natural gas, wherein said clean scavenging reagent from is used as said partially-consumed scavenging reagent.

7. A method as in claim 6, wherein a flow of said partially-consumed scavenging reagent and a flow of said clean scavenging reagent is controlled based on a hydrogen sulfide concentration within said partially-sweetened natural gas.

8. A method as in claim 7, wherein said scavenging reagent consumption is effectively 100% in the step of reacting said partially-consumed scavenging reagent with said sour natural gas.

9. A system in accordance with claim 1, wherein said reaction of said clean scavenging reagent with said partially-sweetened natural gas in said second reactor produces said partially-consumed scavenging reagent, said second reactor separating said partially-consumed scavenging reagent from said sweetened natural gas, said partially-consumed scavenging reagent being delivered from said second reactor to said first reactor via said scavenging reagent delivery control system.

10. A system in accordance with claim 4, wherein said reaction of said clean scavenging reagent with said partially-sweetened natural gas in said second reactor produces said partially-consumed scavenging reagent, said second reactor separating said partially-consumed scavenging reagent from said sweetened natural gas, said partially-consumed scavenging reagent being delivered from said second reactor to said first reactor via said scavenging reagent delivery system.

11. A method in accordance with claim 6, further comprising the steps of:
   providing a first reactor;
   providing a second reactor;
   providing a separator, said partially-consumed scavenging reagent reacting with said sour natural gas in said first reactor to produce said partially-sweetened natural gas and said consumed scavenging reagent, said consumed scavenging reagent being separated from said partially-sweetened natural gas via said separator, said clean scavenging reagent reacting with said partially-sweetened natural gas in said second reactor to produce said sweetened natural gas and said partially-consumed scavenging reagent;
   separating said sweetened natural gas from said partially-consumed scavenging reagent with said second reactor; and
   delivering said partially-consumed scavenging reagent from said second reactor to said first reactor.

* * * * *